United States Patent [19]
Fortes

[11] Patent Number: 5,531,117
[45] Date of Patent: Jul. 2, 1996

[54] CLOSED LOOP MAXIMUM LIKELIHOOD PHASE ABERRATION CORRECTION IN PHASED-ARRAY IMAGING SYSTEMS

[75] Inventor: Jose-Mauro P. Fortes, Gavea, Brazil

[73] Assignee: General Electric Company, Schenectady, N.Y.

[21] Appl. No.: 312,370

[22] Filed: Sep. 26, 1994

[51] Int. Cl.$^6$ ................................................. G01N 29/18
[52] U.S. Cl. ...................... 73/602; 73/626; 73/628; 128/660.06; 128/661.01
[58] Field of Search .................... 128/660.06, 660.07, 128/661.01; 73/597, 599, 602, 625, 626, 628

[56] References Cited

U.S. PATENT DOCUMENTS

| | | | |
|---|---|---|---|
| 4,817,614 | 4/1989 | Hassler et al. | 128/660.05 |
| 4,989,143 | 1/1991 | O'Donnell et al. | 128/661.01 |
| 5,172,343 | 12/1992 | O'Donnell | 367/7 |
| 5,235,983 | 8/1993 | Iida et al. | 128/660.07 |
| 5,388,461 | 2/1995 | Rigby | 73/597 |

OTHER PUBLICATIONS

Flax et al., "Phase–Aberration Correction Using Signals from Point Reflectors and Diffuse Scatters: Basis Principles", IEEE Trans. on Ultrasonics, Ferroelectrics and Frequency Control, vol. 35, No. 6, Nov. 1988, pp.758–767.

Primary Examiner—Hezron E. Williams
Assistant Examiner—Rose M. Finley
Attorney, Agent, or Firm—Marvin Snyder

[57] ABSTRACT

A phased array ultrasonic imaging system performs a scan in which beamforming time delay errors due to nonuniformity in ultrasound speed within the transmission medium are corrected by estimating and correcting phase aberrations in accordance with the maximum likelihood theory. The system employs a multiple-channel transmitter and receiver, and estimates phase values, not phase difference values, thereby eliminating any need to perform an integration to produce the phase aberration profile. The method can be implemented in real-time, allowing correct data to flow out of the circuit which at the same time can be receiving new input data. Delays can be added to allow for phase aberration correction of past measurements. The method allows tracking, to some extent, of variations that may occur in the phase aberrations. Depending on the number of channels that are simultaneously considered, different closed loop circuits can be employed. A one-dimensional closed loop circuit, for example, estimates the phase aberration affecting one single channel, while a two dimensional closed loop circuit jointly estimates the phase aberrations affecting two of the channels.

27 Claims, 10 Drawing Sheets ns. 5,531,117

CLOSED LOOP MAXIMUM LIKELIHOOD PHASE ABERRATION CORRECTION IN PHASED-ARRAY IMAGING SYSTEMS

This invention is related to J. M. P. Fortes application Ser. No. 08/312,363, filed concurrently herewith and assigned to the instant assignee.

FIELD OF THE INVENTION

This invention relates generally to coherent imaging systems using vibratory energy, such as ultrasound energy, which employ multi-element array transducers. In particular, the invention relates to the reflection method for producing ultrasound images in which a single ultrasonic transducer array is used for both transmission and reception of ultrasonic pulses.

BACKGROUND OF THE INVENTION

There are a number of methods in which vibratory energy, such as ultrasound energy, can be used to produce images of objects. In the reflection method, an image is produced in which the brightness of each pixel is a function of the amplitude of the ultrasound reflected from the object to the receiver.

Ultrasonic transducers for medical applications are conventionally constructed from one or more piezoelectric elements sandwiched between a pair of electrodes. When an appropriate voltage pulse is applied, the piezoelectric element emits an ultrasonic pulse into the medium. Conversely, when an ultrasonic pulse strikes the piezoelectric element, the element produces a corresponding voltage across its electrodes. A number of such ultrasonic transducer constructions are disclosed in U.S. Pat. Nos. 4,217,684; 4,425,525; 4,441,503; 4,470,305 and 4,569,231, all of which are assigned to the instant assignee.

When used for ultrasonic imaging, the transducer typically has a plurality of piezoelectric elements arranged in an array and driven with separate voltages. In phased-array imaging systems, transmit steering and focusing are accomplished by making the pulse signals transmitted by individual transducer elements arrive at the same time at a given point in space. By properly controlling the relative time delays of the applied voltages on each element, the ultrasonic waves produced by the piezoelectric elements can be made to combine to produce a net ultrasonic wave focused at a selected point. This focal point can be moved on each successive transmitter firing, so that the transmitted beams can be scanned across the object without moving the transducer.

Similar principles apply when the transducer is employed to receive the reflected sound. The voltages produced at the transducer elements in the array are individually delayed in time and then summed together such that the net signal is dominated by sound reflected from a single receive focal point in the subject. This summed receiver signal is often called the "beamsum".

If the medium is homogeneous and the velocity of sound is known, then the time it takes for a pulse to travel from a given transducer element to a point in space, or vice versa, is determined by simple geometry. Thus, to make all of the pulses arrive in coincidence, time delays are calculated to exactly compensate for geometric path length differences to each element.

For a wave at a single frequency f, it is well known that a shift in time $\Delta t$ is equivalent to a shift in phase $\Delta\theta$ through the relationship $\Delta\theta=2\pi\theta\Delta t$. The pulses typically used in ultrasound imaging contain a wide range of frequencies, so this equivalence is only approximate. Some ultrasound imaging systems use the approximate equivalence to combine time delays and phase delays to produce the desired focusing on transmit and/or receive. The process of applying time and/or phase delays to produce focused transmit and receive beams is often called "beamforming."

An ultrasound image is formed by making a series of reflection measurements in a set of desired directions. For each measurement, a focused ultrasonic wave is transmitted. Then the system switches to receive mode and the reflected ultrasonic wave is received, focused and stored. When a complete set of scan directions has been obtained, the ultrasound image is constructed and displayed, and the process then repeats for the next imaging frame. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184, all of which are assigned to the instant assignee.

Any factor causing a variation in pulse arrival times will produce phase variations across the transducer array, thereby reducing transducer efficiency and its ability to distinguish between on-axis and off-axis signals. For example, spatial inhomogeneities of the refraction index can lead to significant variations in propagation velocity, inducing phase delays (phase aberrations) that reduce the efficiency and the directivity of the transducer. If the sound speed is not constant, sound pulses transmitted from certain elements in the array can arrive earlier or later than expected at the desired focal point and will not properly combine with the other pulses. As a result, the net transmitted wave will not be optimally focused. Similarly, on reception, the signals on each element in the array will not be delayed optimally before summing so that the receive focusing will be degraded. If the deviations from the assumed propagation times could be measured or estimated, the ultrasound image could be improved by correcting the applied time delays for the deviations.

The human body is known to consist of many different tissues with differing sound speeds. Despite this, in medical applications the assumption of constant sound speed produces good images on many patients. However, the distribution of the various tissue types varies widely with patients, and some patients are only poorly imaged. The body wall, in particular, which includes relatively thick muscle and fat layers with sound speeds significantly different from the average sound speeds of the internal organs, can degrade the image for some patients. The solution to this problem involves correcting for phase aberrations so that transducer efficiency and directivity are restored. There would be a substantial medical benefit if the images of these patients could be improved by correcting for nonuniformity in the ultrasound propagation speed in their bodies. Such phase aberration corrections may need calculation for each separate transmit/receive direction, since the ultrasound propagation speed nonuniformities may vary significantly with beam direction. The corrections may also require calculation on a real-time basis due to patient and transducer motion in clinical applications.

A general phase aberration correction method applicable to coherent imaging systems using a sampled aperture has been proposed by Flax and O'Donnell, *Phase-Aberration Correction Using Signals from Point Reflectors and Diffuse Scatterers: Basic Principles*, IEEE Trans. on Ultrasonics, Ferroelectrics and Frequency Control, Vol. 35, No. 6, November 1988. Signals emanating from a point source, or a small region of distributed scatterers, exhibit uniformity across the transducer array. Since focus exists only if the signal from a point radiator arrives at each transducer element in coincidence, the degree to which coincidence is violated is a measure of the "lack of focus" or "arrival time (phase) error." If the signal at each element is very similar, then the time offsets can be readily detected and quantified using a cross-correlation measurement between any two elements. In particular, the time offset of the peak in the cross-correlation function is a direct measure of the arrival time difference between neighboring channels. The method of Flax and O'Donnell uses only phase difference information associated with adjacent elements in a phased-array system. In the method of Flax and O'Donnell (and other prior art methods), the phase difference estimates are indirectly obtained from estimates of the correlation function associated with pairs of channel signals. Prior art phased-array imaging systems do not correct phase aberrations by using closed loop circuits, in which phase estimates are directly obtained from measured data (and not from estimated correlation functions).

SUMMARY OF THE INVENTION

Accordingly, one object of the invention is to provide a method and apparatus for correcting phase aberrations in phased array imaging systems in which phase estimates are obtained directly from measured data.

Another object is to provide a method and apparatus for correcting phase aberrations in phased array imaging systems wherein, depending on the number of channels that are simultaneously considered (dimension of the circuit), different closed loop circuits can be developed for obtaining phase estimates directly from measured data.

Another object is to provide a method and apparatus for correcting phase aberrations in a phased array imaging system, in real time, by employing a two-dimensional closed loop circuit for jointly estimating phase aberrations affecting two of the channels in the system.

Briefly, in accordance with a preferred embodiment of the invention, a method and apparatus are provided to correct for focusing degradation in an ultrasound imaging system caused by variations in ultrasound propagation speed within the transmission medium. Correction phase rotations are calculated for each transducer element using acquired beam data. The apparatus includes a multi-element ultrasonic transducer; a transmitter which applies to the separate transducer elements pulses delayed by amounts necessary to steer an ultrasonic beam in a desired direction; a receiver responsive to each transducer element for providing a separate delay to the echo signal produced by each transducer element to form a receive beam steered in the desired direction; and a phase aberration correction circuit responsive to the receiver and operable to measure the phase aberration error for each transducer element using a closed loop algorithm based on the maximum likelihood theory. The phase aberration correction means produces a correction phase rotation for each transducer element, using acquired beam data. The set of correction phase rotations thus produced is applied on subsequent transmitter firings for the same beam direction to correct the timing of the pulses applied to the respective transducer elements by the transmitter. The set of correction phase rotations is also employed to correct the delays imposed by the receiver on the echo signals produced by the respective transducer elements.

The phase aberration correction circuit employing a two-dimensional closed loop maximum likelihood algorithm has numerous advantages over prior art schemes for correcting phase aberration in phased-array imaging systems, including the following:

(1) Phase values are estimated, not phase difference values, thereby eliminating any need to perform an integration to obtain the phase aberration profile. This means that the error variances are not integrated across the phase profile and, as a consequence, the results do not show an undesirable linear bias.

(2) $2\pi$ phase slips present no special problems since the estimated phase profile and its modulo $2\pi$ equivalent both provide exactly the same phase-corrected output signals.

(3) Correct data can be obtained from the system in real time while new input data are being supplied to the system. Delays can be added to allow for phase aberration correction of past measurements.

(4) The system can track, to some extent, variations that may occur in the phase aberrations, although there is a trade-off between the system's tracking and acquisition performances.

(5) The system performs a built-in deconvolution of the time correlation, which is performed by whitening filters.

(6) The phase aberrations are directly estimated from measured data, not from the cross-channel correlation function.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF THE PREFERRED EMBODIMENTS

Figure 1:
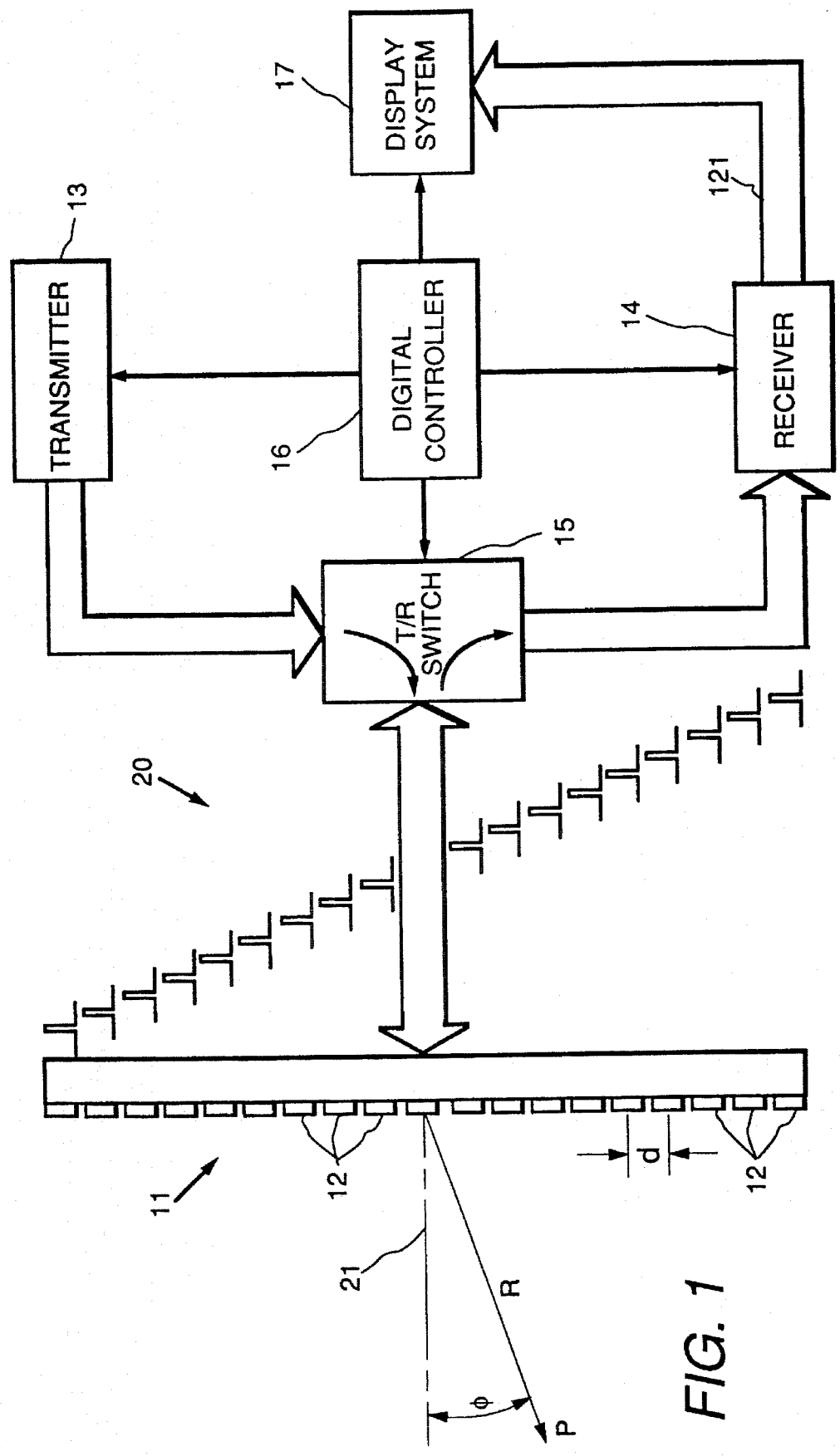
FIG. 1 is a block diagram of an ultrasonic imaging system employing the present invention.

As shown in FIG. 1, a vibratory energy imaging system includes a transducer array 11 comprised of a plurality of separately driven elements 12 which each produce a burst of vibratory energy, such as ultrasonic energy, when energized by a pulse produced by a transmitter 13. The vibratory energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 5 are operated under control of a digital controller 6 responsive to commands by a human operator. Each scan line in the image is constructed by acquiring a series of echoes. Switches 15 are set to their transmit positions, transmitter 13 is gated on momentarily to energize each transducer element 12, switches 15 are then set to their receive positions, and the subsequent echo signals produced by each transducer element 12 are applied to receiver 14. The separate echo signals from each transducer element 12 are combined in receiver 14 to produce a single echo signal corresponding to a single scan line. A display system 17 receives the series of data samples produced by receiver 14 for all the scan lines and converts the data to a form producing one frame of the desired image.

Transmitter 13 drives transducer array 11 such that the vibratory energy produced (e.g., ultrasonic energy) is directed, or steered, and focused in a beam. A complete scan can therefore be performed by moving this beam through a set of angles $\phi_i$. To accomplish this, transmitter 13 imparts a time delay $T_{t,k}$, k=1, ..., N, to the respective pulses 20 that are applied to N transducer elements 12. Time delays $T_{t,k}$ are chosen so that the pulses from each transducer element will arrive at the desired transmit focus point (R, $\phi_i$) simultaneously.

Figure 2:
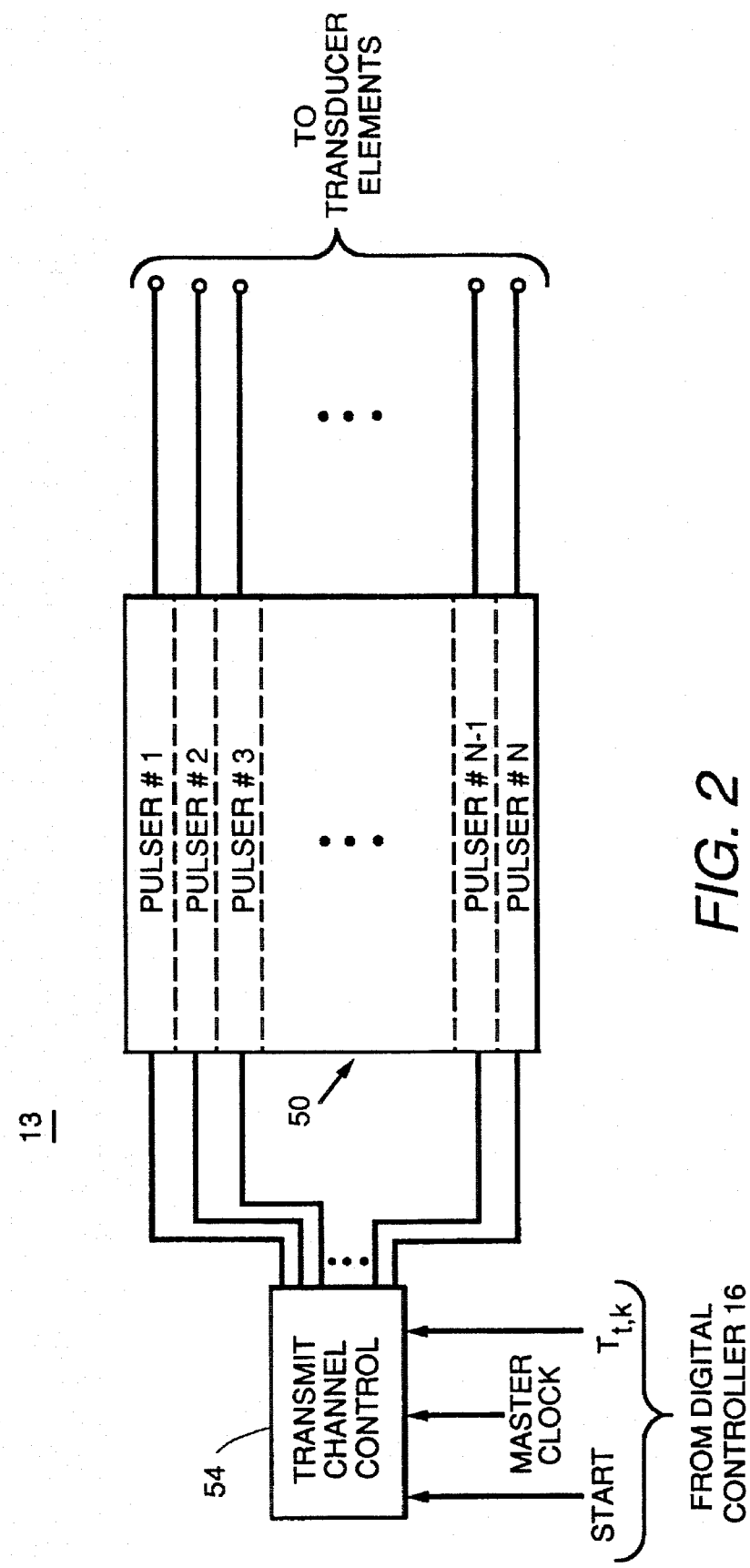
FIGS. 2 and 3 are block diagrams of a transmitter and a receiver, respectively, which form part of the system of FIG. 1.

As shown in FIG. 2, transmitter 13 comprises a transmit channel control section 54 and pulsers 50. The transmit channel control receives from digital controller 16, shown in FIG. 1, two control signals, START and MASTER CLOCK, and the transmit time delays $T_{t,k}$. Using the MASTER CLOCK signal as the timing reference, the transmit channel control generates a timing signal for each of pulsers 50 at the respective times $T_{t,k}$ after reception of the START signal, which signals the beginning of a single transmit/receive beam cycle. Upon reception of its respective timing signal, each pulser generates an electrical pulse which is conveyed to the corresponding transducer element through a respective one of T/R switches 15, shown in FIG. 1. The transducer element converts the electrical pulse into an ultrasonic pulse.

The echo signals produced by each burst of ultrasonic energy emanate from reflecting objects located at successive positions along the scan line direction. These are sensed separately by each element 12 of transducer array 11 shown in FIG. 1. Receiver 14, shown in FIG. 1, amplifies these separate echo signals, imparts the proper time delay to each, and sums them together to provide a single echo signal which accurately indicates the total ultrasonic energy reflected from the receive focal point P, shown in FIG. 1. The time delays for the receiver are calculated as for the transmitter by taking into account the propagation time from the focal point to each transducer element.

Figure 3:
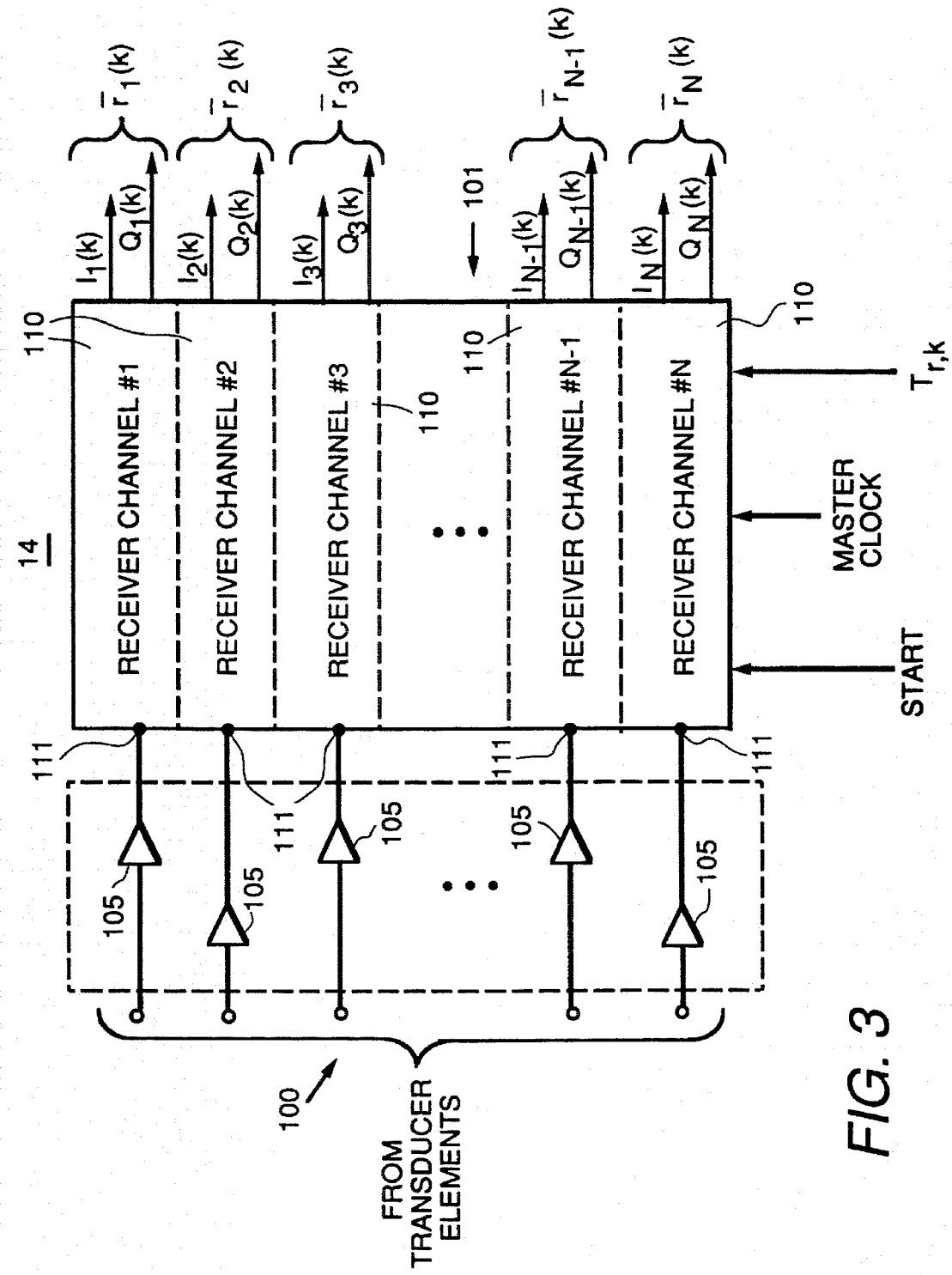

As shown in FIG. 3, receiver 14 comprises an amplifier section 100 and a receive beamforming section 101. Each transducer element 12, shown in FIG. 1, is connected through a respective one of T/R switches 15, shown in FIG. 1, to an amplifier 105 which amplifies the echo signal received by the transducer element. The amplified signal from each amplifier is applied to a respective receiver channel 110. Each receiver channel receives from digital controller 16, shown in FIG. 1, two control signals, START and MASTER CLOCK, and the corresponding receive time delay $T_{r,k}$. Each receiver channel samples and demodulates the analog echo signal from the amplifier, producing a stream of digital complex signal samples r(k) having components I(k) and Q(k). The I and Q signals are digital numbers representing the in-phase and quadrature components of the demodulated echo signal. Using the MASTER CLOCK signal, these samples are delayed by the receiver channels by the corresponding time delays $T_{r,k}$ with respect to the START signal, which signals the beginning of a single transmit/receive beam cycle.

The present invention estimates phase aberration due to spatial inhomogeneities in the ultrasound-propagating medium and produces the phase rotations $\hat{\phi}_i$, which are then applied to the complex signal samples to correct the phase aberrations. Corrections can be applied in either the transmission or reception mode.

Figure 4:
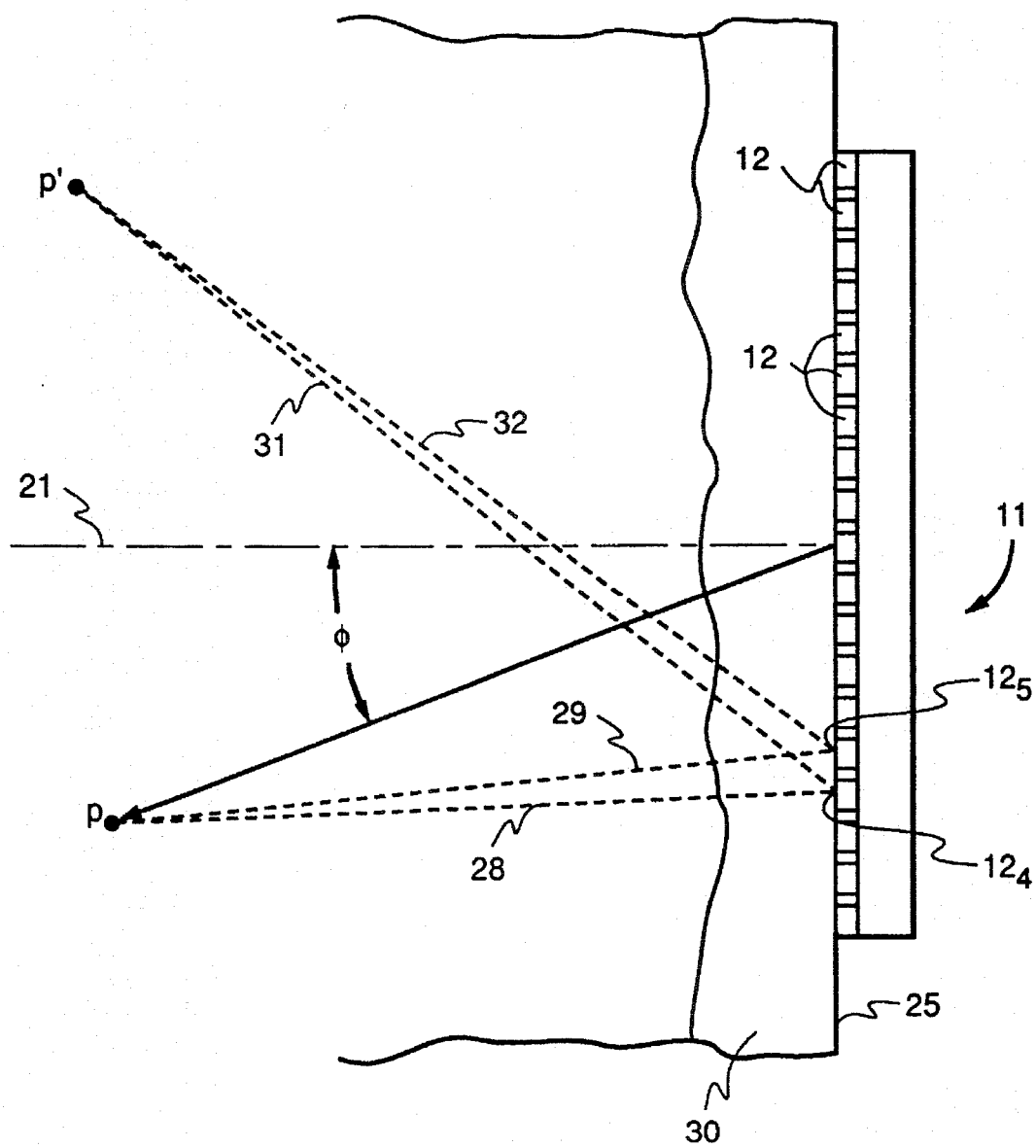
FIG. 4 is a schematic representation of the ultrasonic transducer used in the system of FIG. 1 which illustrates the effect of nonuniformities in the ultrasound transmission medium.

In clinical applications the assumption of uniform ultrasound propagation speed along the beam path can often be invalid. As shown in FIG. 4, ultrasonic transducer 11 is typically placed on the patient's skin 25. Ultrasonic energy transmitted into and received from the region of interest may pass through several layers of tissue which are likely to have different ultrasound propagation properties, in particular, different ultrasound transmission speeds. The presence of tissue layers with ultrasound transmission speeds other than that assumed for the transmit and receive time delay equations causes phase aberrations. When the layers have irregular boundaries, the phase aberration angle can vary from element to element, resulting in substantial degradation of the transmit and receive focusing. Consider as an example the case shown in FIG. 4 in which a boundary 26 between two tissue layers is irregularly shaped. When beam samples are acquired from point P at steering angle $\phi$, ultrasound energy conveyed between point P and two separate array elements $12_4$ and $12_5$ is propagated quite differently due to the irregularity of boundary 26. This is illustrated by the respective dashed lines 28 and 29 which reveal that the ultrasound path length in tissue layer 30 is longer for transducer element $12_5$ than for transducer element $12_4$. This difference in path length within tissue layer 30 extending to the two transducer elements $12_4$ and $12_5$ causes different phase aberration angles for these two elements. The same tissue layer may cause an element-dependent phase aberration for other transducer elements 12, and the same tissue layer may cause an element-dependent phase aberration for the same elements $12_4$ and $12_5$ at different steering angles $\phi$. This is illustrated by the ultrasound paths 31 and 32 to a point P' which have very similar path lengths within tissue layer 30. Thus, in general, phase aberrations caused by nonuniformities in the sound-propagating medium are different for each transducer element 12 and for each beam direction $\phi_i$ acquired during the scan.

Let $r_i(k)$, $k=1, \ldots, K$, denote complex samples of the signal reaching array element i (i-th channel) $\overline{R}(\ )$ in a phased-array imaging system. Assume that $r_i(k)$ is equal to a phase-aberrated version of the sum of the desired signal $s(k)$ and a speckle signal (noise) $w_i(k)$, that is, $$r_i(k) = e^{j\theta_i}[s(k) + w_i(k)] \qquad (1)$$

where $k=1, \ldots, K$, K being the number of past samples that the circuit is using at any given moment; $i=1, \ldots, N$, N being the number of receive channels; and $\theta_i$ represents the phase distortion (aberration) experienced by the signal in channel i.

Assume that the stochastic processes $w_i(k)$ characterizing the speckle noise can be modeled as complex, zero mean, jointly wide sense stationary Gaussian processes, with cross-correlation functions $$R_{ij}(k,l) = E[w_i(k)w^*_j(l)] = \lambda_{ij}\overline{R}_i(k-l) \qquad (2)$$

Generally speaking, the problem is to jointly estimate the phase aberration affecting M of the N available channels (M<N), assuming that the desired signal $s(k)$ and the normalized in-channel autocorrelation function $\overline{R}_i(k-l)$ are known. In accordance with the present invention, when the desired signal $s(k)$ is not known exactly, the average of all received signals, i.e., "beamsum"/N, can be used instead. The complex correlations $\lambda_{ij}$ are also considered as unknowns. Under these assumptions, two different circuits for implementing the present invention are hereinafter described: a two-dimensional closed loop circuit (M=2) and a one-dimensional closed loop circuit (M=1).

For the two-dimensional closed loop circuit, consider the situation in which it is desired to jointly estimate the phase aberrations affecting two of the channels, e.g., channels i and j. In this particular case, the maximum likelihood estimates of the phase aberrations can be shown to be:

$$\hat{\theta}_{ML} = \begin{pmatrix} \hat{\theta}_i \\ \hat{\theta}_j \end{pmatrix} = \min_\theta{}^{-1} \ln[g(\theta)] \qquad (3)$$

where $g(\theta)$ is given by $$g(\theta) = (P_i - Q_i(\theta_i) - Q^*_i(\theta_i) + P_s)(P_j - Q_j(\theta_j) - Q^*_j(\theta_j) + P_s) - |X_{ij}(\theta_i,\theta_j) - Q^*_i(\theta_i) - Q_j(\theta_j) + P_s|^2 \qquad (4)$$

with $$P_s = \sum_{k=1}^{K} \sum_{l=1}^{K} \overline{a}_{kl} s(k) s^*(l) \qquad (5)$$

$$P_i = \sum_{k=1}^{K} \sum_{l=1}^{K} \overline{a}_{kl} R_i(k) R_i^*(l) \qquad (6)$$

$$P_j = \sum_{k=1}^{K} \sum_{l=1}^{K} \overline{a}_{kl} R_j(k) R_j^*(l) \qquad (7)$$

$$Q_i(\theta_i) = e^{-j\theta_i} \sum_{k=1}^{K} \sum_{l=1}^{K} \overline{a}_{kl} R_i(k) s^*(l) \qquad (8)$$

$$Q_j(\theta_j) = e^{-j\theta_j} \sum_{k=1}^{K} \sum_{l=1}^{K} \overline{a}_{kl} R_j(k) s^*(l) \qquad (9)$$

$$X_{ij}(\theta_i, \theta_j) = e^{-j\theta_i} e^{j\theta_j} \sum_{k=1}^{K} \sum_{l=1}^{K} \overline{a}_{kl} R_i(k) R_j^*(l) \qquad (10)$$

In Eqs. (5) to (10), $\overline{a}_{kl}$ denotes the elements of the inverse of a Toeplitz Hermitian-symmetric matrix A, whose elements $a_{kl}$ are given by $$a_{kl} = \frac{1}{2} \overline{R}(k-l) \qquad (11)$$

where $k=1, \ldots, K$ and $l=1, \ldots, K$, and $\overline{R}()$ is the normalized in-channel time autocorrelation function. Also in Eqs. (5) to (10), $R_i(k)$ and $R_j(k)$ represent samples of the received signals in channels i and j, respectively.

It is desired to obtain the maximum likelihood estimate $\hat{\theta}_{ML}$ through a gradient optimization technique, using a closed loop circuit of the phase locked loop (PLL) type. The components of the gradient of $g(\theta)$ can be shown to be $$\frac{\partial}{\partial \theta_i} \ln[g(\theta)] = \qquad (12)$$

$$\frac{-2\Im[(P_j - Q_j^*(\theta_j))Q_i(\theta_i) + (P_s - Q_j(\theta_j))X_{ij}(\theta_i,\theta_j)]}{g(\theta)}$$

and $$\frac{\partial}{\partial \theta_j} \ln[g(\theta)] = \qquad (13)$$

$$\frac{-2\Im[(P_i - Q_i^*(\theta_i))Q_j(\theta_j) + (P_s - Q_i(\theta_i))X_{ij}^*(\theta_i,\theta_j)]}{g(\theta)}$$

In Eqs. (12) and (13), $\Im(x)$ denotes the imaginary part of x.

Figure 5:
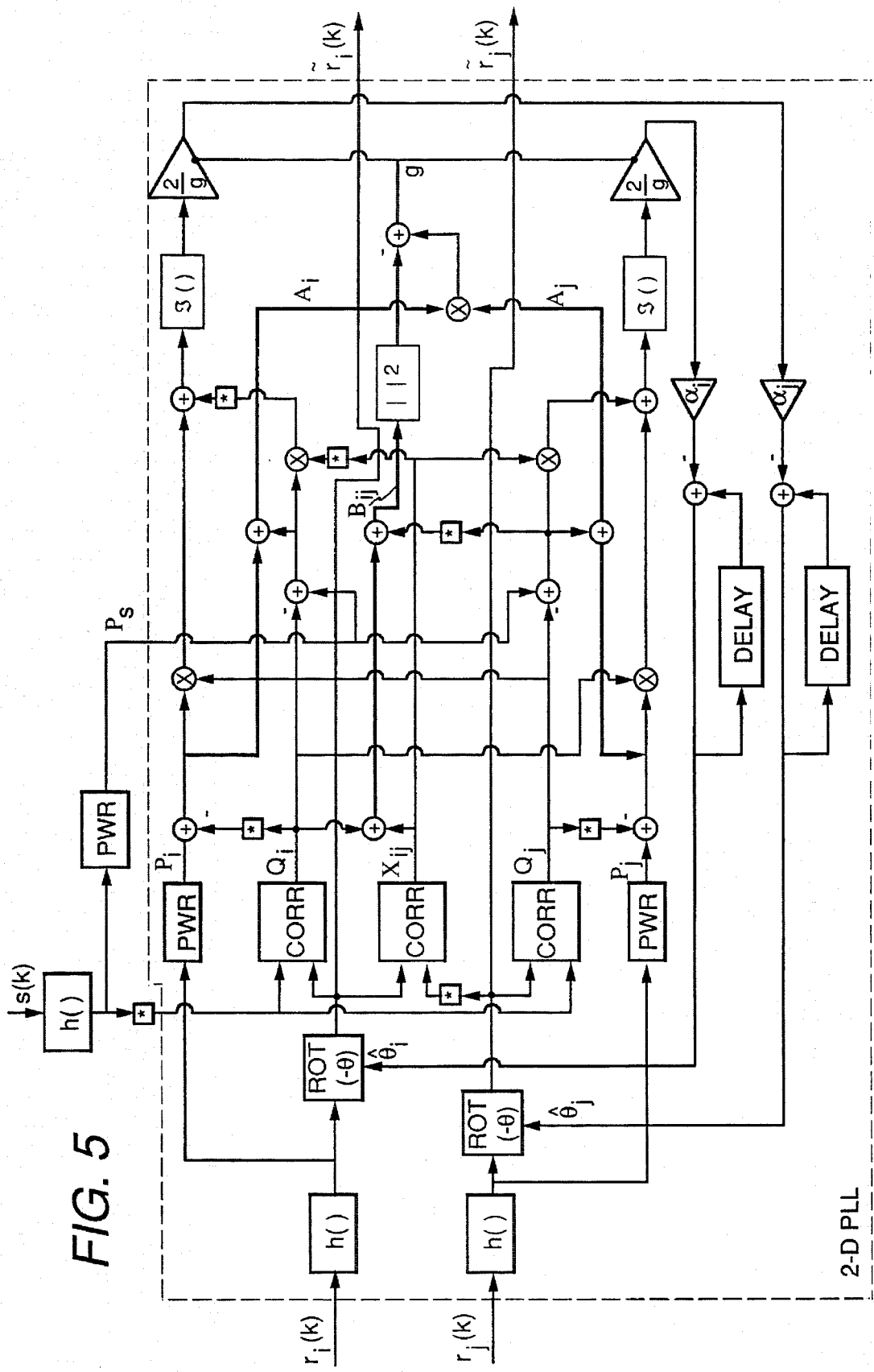
FIGS. 5 and 8 are block diagrams showing respective preferred embodiments of a two-dimensional closed loop circuit for implementing the maximum likelihood estimator of the present invention.
Figure 6:
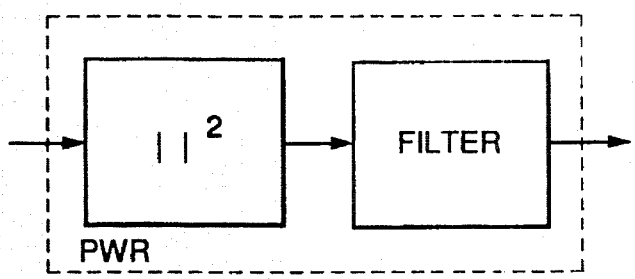
FIGS. 6 and 7 are block diagrams showing respective preferred implementations for the power calculator and input correlator employed in the circuits of FIGS. 5 and 8.
Figure 7:
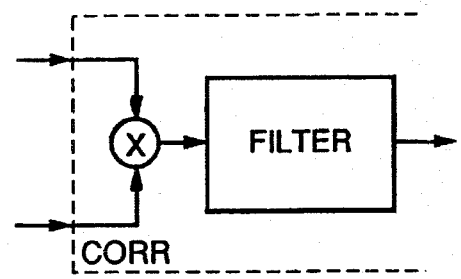

The circuit for implementing the gradient optimization technique is presented in FIG. 5. In this circuit, the quadratic forms in Eqs. (5) to (10) are implemented by correlating adequately filtered signals. These filters are whitening filters having an impulse response $h(\ )$ selected to eliminate, by deconvolution, the time correlation expressed in Eq. (2). A power calculation circuit PWR performs the power calculation over a given range of complex signal samples $r_i(k)$ and $r_j(k)$ (or over a given interval). A correlation circuit CORR correlates its input signals over the same interval. The PWR and CORR circuits can be readily implemented using the circuit arrangements illustrated in FIGS. 6 and 7. A phase rotation circuit ROT serves to rotate the phase of each respective whitening filter by an angle equal to the phase distortion of the signal in the channel in which the whitening filter is situated. Thus, the phase aberration estimate, based on data within a given interval, is used to correct the phase aberration of the first complex signal sample after the end of the interval. The remainder of the components of the circuit shown in FIG. 5 are either conventional arithmetical operation circuits, as indicated by the symbol thereon, or delay circuits and amplifiers of gain indicated thereon.

Figure 8:
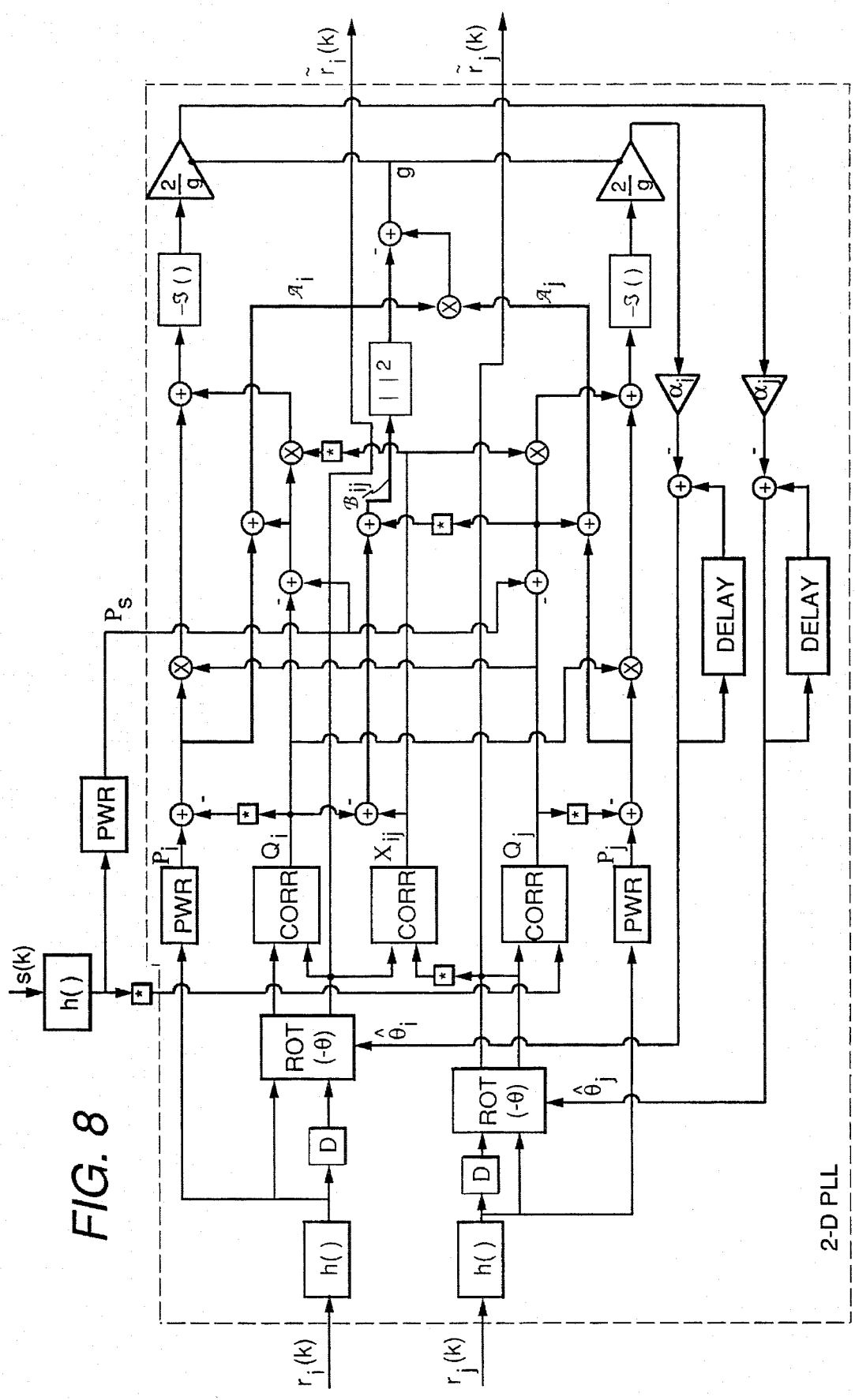

A possible alternative to the circuit of FIG. 5 would use the phase estimate, based on data within a given interval, to correct the phase aberration of the first complex signal sample in the middle of the interval, instead of after the end of the interval. This can be accomplished by adding a delay just after each input filter, and allowing the circuit to phase correct the delayed versions of its input signals. FIG. 8 illustrates the closed loop maximum likelihood circuit, as modified to allow the correction of the phase aberration of the complex signal sample in the middle of the interval. In this case, each block labeled D represents a delay corresponding to half of the interval size.

Instead of minimizing $\ln[g(\theta)]$, one could choose to minimize $g(\theta)$. Although the two approaches theoretically lead to the same result, there is a difference between them. When $\ln[g(\theta)]$ is minimized, the components of the gradient are proportional to the inverse of $g(\theta)$. In this case, $g^{-1}(\theta)$ acts like a controlling gain, making circuit performance less sensitive to the choices of gains $\alpha_i$ and $\alpha_j$. This is not the case if it is chosen to minimize $g(\theta)$, in which case, the choices of gains $\alpha_i$ and $\alpha_j$ are more critical.

Figure 9:
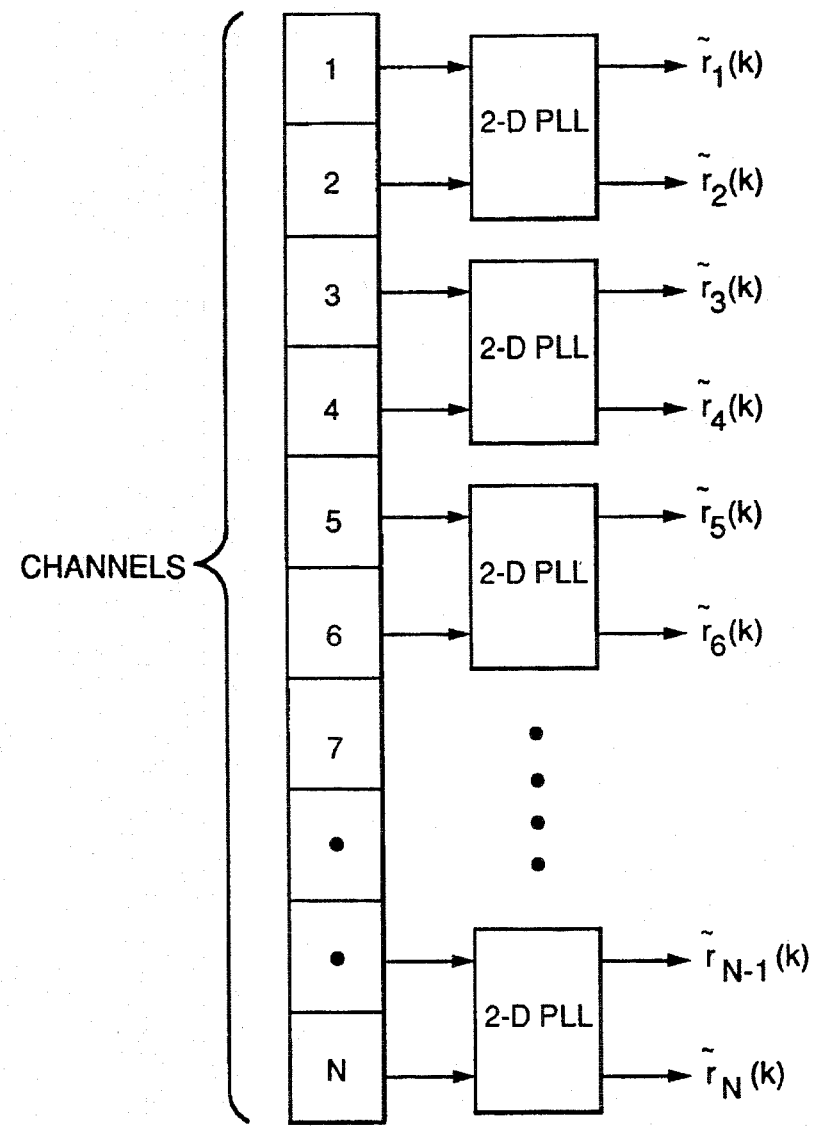
FIGS. 9 and 10 are block diagrams, each of which shows a respective system comprising a plurality of two-dimensional closed loop circuits for estimating phase aberrations in an N-channel coherent imaging system.
Figure 10:
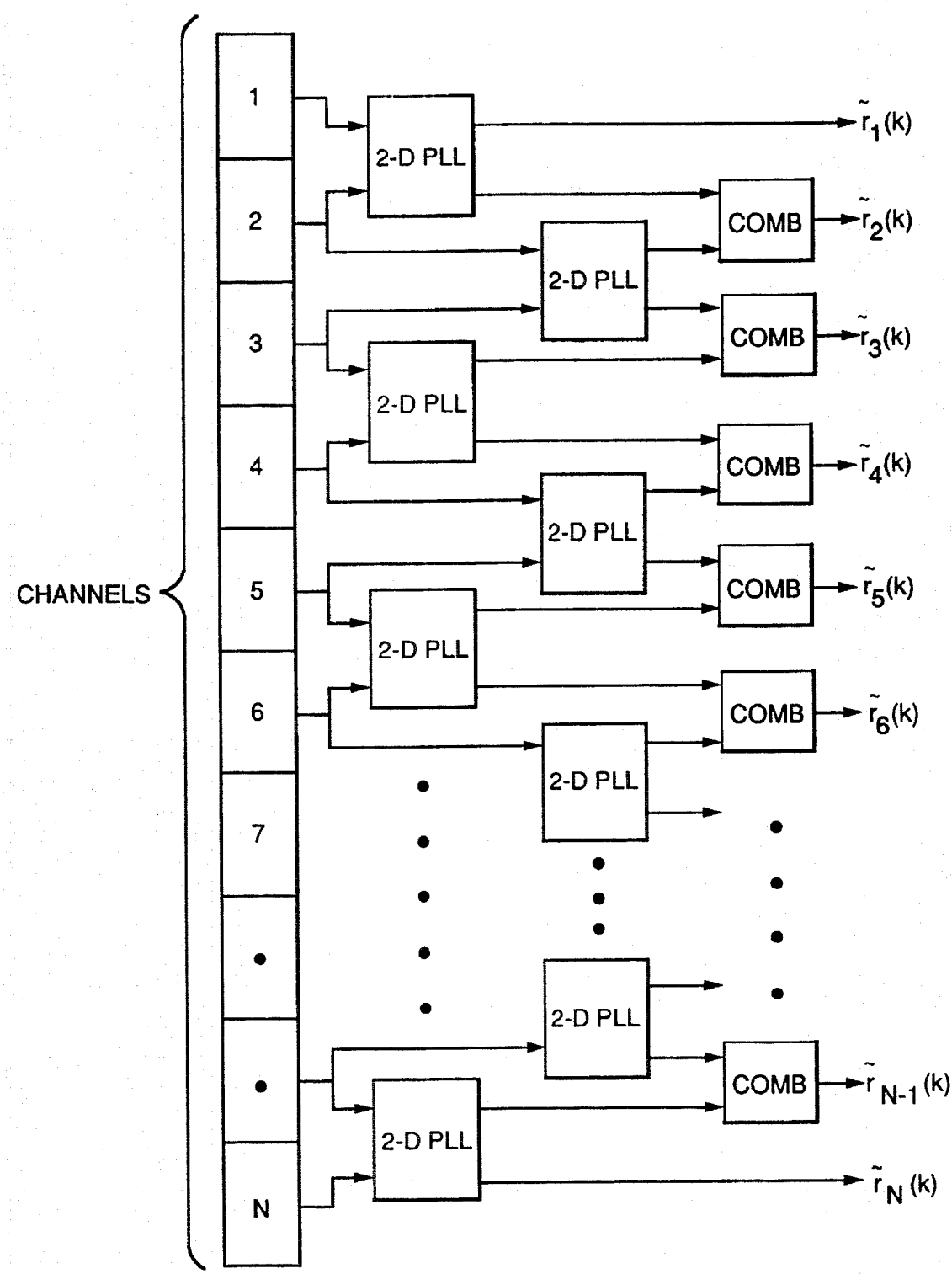
Figure 11:
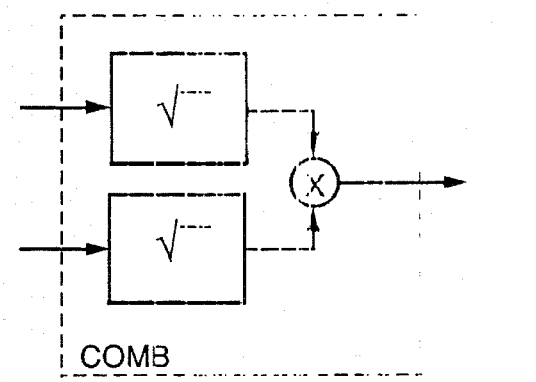
FIG. 11 is a block diagram of a preferred implementation for the combiner employed in the system of FIG. 10.

There are several ways these two-dimensional closed loop circuits can be used to estimate phase aberrations in an N-channel coherent imaging system. The systems shown in FIGS. 9 and 10 are examples of such suitable closed loop systems. The system of FIG. 10 utilizes combining circuits (COMB) to merge the two phase estimates, associated with the same array element, into a single one. FIG. 11 is a block diagram of the combining circuit, which produces an output signal equal to the product of the square roots of its input signals.

In considering the simpler situation in which an estimate of the phase aberration affecting one of the channels, e.g., channel i, is sought, again the desired signal s(k) and the normalized in-channel autocorrelation function $\bar{R}_i(k-l)$ are assumed to be known and the complex coefficient $\lambda_{ii}$ is considered as unknown. In this particular case, the maximum likelihood estimate of the phase aberration in channel i can be shown to be $$\hat{\theta}_{iML} = \max_{\theta_i}^{-1} \{-\ln[g(\theta_i)]\} \tag{14}$$

where $$g(\theta_i) = (P_i - Q_i(\theta_i) - Q_i^*(\theta_i) + P_s) \tag{15}$$

where $P_s$, $P_i$ and $Q_i(\theta_i)$ are respectively given by Eqs. (5), (6) and (8).

If phase aberration estimates are sought through a gradient optimization technique, using a closed loop circuit, it must be considered that $$\frac{\partial}{\partial \theta_i} \ln[g(\theta_i)] = \frac{-2\Im[Q_i(\theta_i)]}{g(\theta_i)} \tag{16}$$

Figure 12:
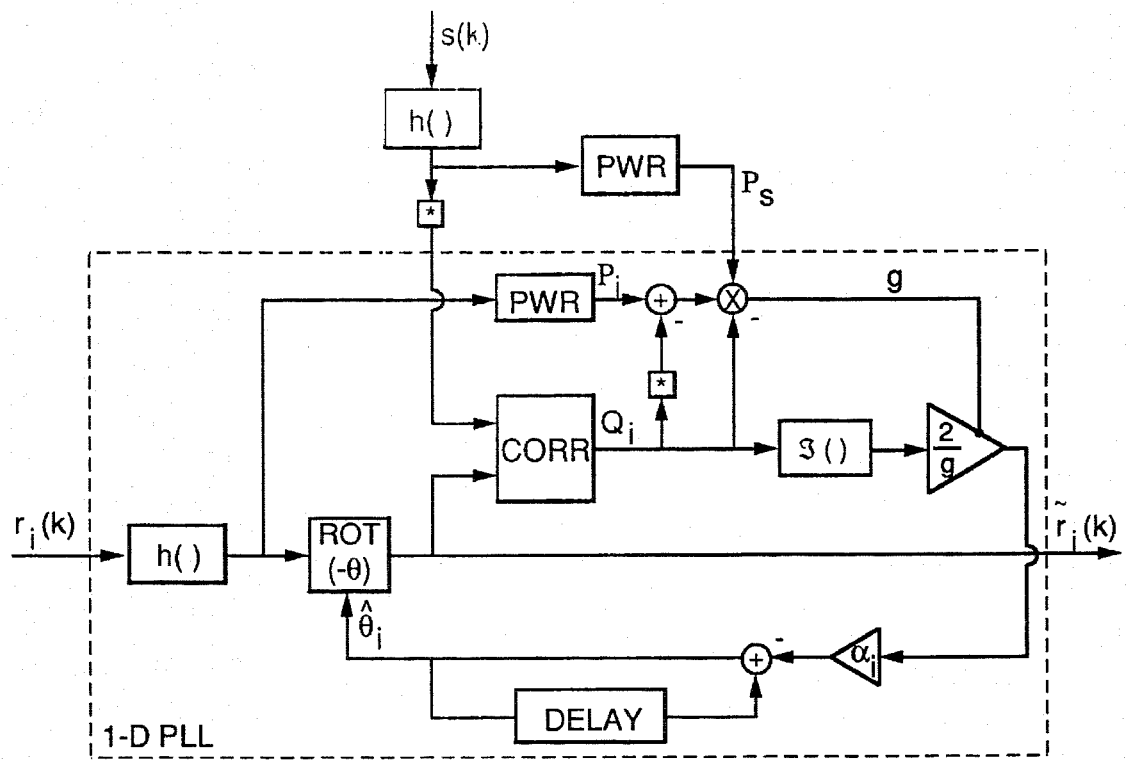
FIG. 12 is a block diagram of a one-dimensional closed loop circuit for implementing the maximum likelihood estimator of the present invention.

In this case, the closed loop circuit to be used is shown in FIG. 12.

Figure 14:
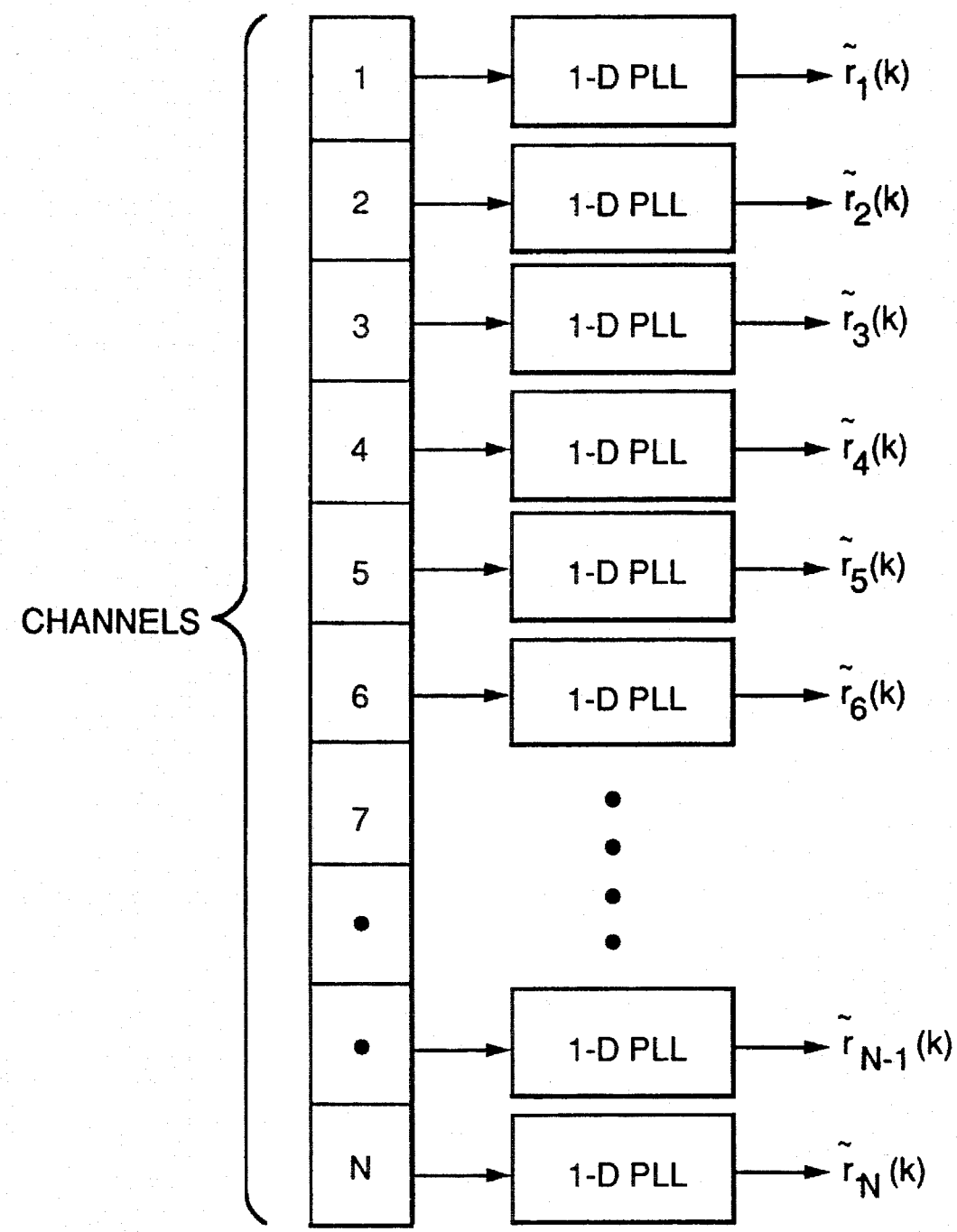
FIG. 14 is a block diagram of a system comprising a plurality of one-dimensional closed loop circuits for estimating phase aberrations in an N-channel coherent imaging system.

There are several ways the one-dimensional closed loop circuit of FIG. 12 can be used to estimate phase aberrations in an N-channel coherent imaging system. The circuit arrangement shown in FIG. 14 is an example of a suitable system, wherein each circuit designated 1-D PLL corresponds to a one-dimensional phase-locked loop circuit of the type shown in FIG. 12.

Instead of solving Eq. (14) by using a gradient optimization technique, it can be solved analytically. In this case, the solution would be $$\hat{\theta}_{iML} = \angle D_i \tag{17}$$

where $D_i$ is given by $$D_i = \sum_{k=1}^{K} \sum_{l=1}^{K} \bar{a}_{kl} R_i(k) s^*(l) \tag{18}$$

Figure 13:
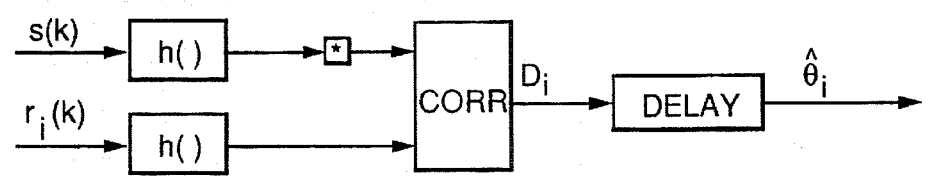
FIG. 13 is a block diagram of an equivalent open loop circuit for implementing a one-dimensional maximum likelihood estimator.

In accordance with Eq. 18, an equivalent circuit to implement the one-dimensional maximum likelihood estimator of phase aberration in channel i would be the one shown in FIG. 13. Except for the input filters h(), this represents the algorithm discussed in K. W. Rigby U.S. patent application Ser. No. 08/182,323, filed Jan. 18, 1994, and assigned to the instant assignee. It is an open loop circuit and, as such, it does not have the features available in a closed loop circuit (such as the ability to track time phase variations).

The above-described circuits of FIGS. 9 and 10, being in two-dimensional form, require a low degree of interconnection between the various channels. The degree of interconnection increases as the algorithm dimension increases (e.g., as to 3-D or 4-D, for example).

It has also been observed that the influence of the reference signal s(k) on the resulting phase estimates decreases as the maximum likelihood estimator goes from the one-dimensional circuit to the two-dimensional circuit. This influence can be further reduced as the maximum likelihood estimator goes to higher dimensions. This fact is not of much importance when the reference signal is made equal to the desired signal. In practice, since a distorted noisy version of the desired signal is used, it is advisable to work with circuits in which the influence of the reference signal on the resulting phase estimates is not dominant. In this sense, the two-dimensional closed loop circuit is a good compromise, since it provides phase estimates that are less dependent on the reference signal than those obtained with the one-dimensional circuit, without increasing the number of channel interconnections to an undesirable degree.

Although primarily developed for ultrasound medical imaging systems, the present invention is applicable to a variety of other sampled aperture imaging systems, such as phased array and synthetic aperture radar or sonar systems. Accordingly, while only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A sampled aperture imaging system comprising:

a plurality of transducers arranged in a sequence to form an array;

means for selectively operating said transducers in a transmission mode to produce propagating energy pulses from electrical driving signals;

means for selectively operating said transducers in a reception mode to produce analog electrical detection signals in respective ones of a plurality of receive channels in response to detection of reflected energy pulses, each receive channel being coupled to a corresponding one of said transducers and comprising means for sampling and demodulating said analog electrical detection signals into digital complex signal samples; and a plurality of phase locked loops for estimating maximum likelihood of phase aberration angles associated with digital complex signal samples of said receive channels.

2. The sampled aperture imaging system as defined in claim 1, wherein a first of said phase locked loops comprises a two-dimensional phase locked loop for estimating maximum likelihood of first and second phase aberration angles associated with digital complex signal samples of first and second ones of said receive channels.

3. The sampled aperture imaging system as defined in claim 2, wherein said first two-dimensional phase locked loop comprises first correlation means for correlating digital complex signal samples of the first receive channel with a reference signal, said reference signal representing an average of the digital complex signal samples of said plurality of receive channels.

4. The sampled aperture imaging system as defined in claim 3, wherein said first two-dimensional phase locked loop further comprises second correlation means for correlating digital complex signal samples of the second receive channel with digital complex signal samples of said first receive channel, and third correlation means for correlating digital complex signal samples of said second receive channel with said reference signal, whereby said first two-dimensional phase locked loop is adapted to simultaneously estimate maximum likelihood of said first phase aberration angle associated with digital complex signal samples of said first receive channel and maximum likelihood of said second phase aberration angle associated with digital complex signal samples of said second receive channel.

5. The sampled aperture imaging system as defined in claim 2, wherein said first two-dimensional phase locked loop further comprises first power calculation means for calculating power of the digital complex samples of the first receive channel.

6. The sampled aperture imaging system as defined in claim 5, wherein said first two-dimensional phase locked loop further comprises second power calculation means for calculating power of the digital complex signal samples of the second receive channel, and third power calculation means for calculating power of digital complex signal samples of said reference signal.

7. The sampled aperture imaging system as defined in claim 2, wherein said first two-dimensional phase locked loop further comprises first phase rotating means for correcting phase of the digital complex signal samples of the first receive channel by an amount equal to said first phase aberration angle.

8. The sampled aperture imaging system as defined in claim 7, wherein said first two-dimensional phase locked loop further comprises second phase rotating means for correcting phase of the digital complex signal samples of the second receive channel by an amount equal to said second phase aberration angle.

9. The sampled aperture imaging system as defined in claim 8, wherein said first two-dimensional phase locked loop further comprises a first whitening filter for filtering the digital complex signal samples of said first receive channel, said first whitening filter having an output coupled to an input of said first phase rotating means and having an impulse response selected to perform deconvolution of a first time correlation.

10. The sampled aperture imaging system as defined in claim 9, wherein said first two-dimensional phase locked loop further comprises a second whitening filter for filtering the digital complex signal samples of said second receive channel, said second whitening filter having an output coupled to an input of said second phase rotating means and having an impulse response selected to perform deconvolution of a second time correlation.

11. The sampled aperture imaging system as defined in claim 3, wherein said first two-dimensional phase locked loop further comprises a whitening filter for filtering the digital complex signal samples of said reference signal.

12. The sampled aperture imaging system as defined in claim 2, wherein a second of said two-dimensional phase locked loops includes inputs for receiving digital complex signal samples from third and fourth receive channels, said second two-dimensional phase locked loop being configured identically to said first two-dimensional phase locked loop.

13. The sampled aperture imaging system as defined in claim 2, wherein a second of said two-dimensional phase locked loops includes inputs for receiving digital complex signal samples from said second receive channel and a third receive channel, said second two-dimensional phase locked loop being configured identically to said first two-dimensional phase locked loop.

14. The sampled aperture imaging system as defined in claim 13, further comprising means for combining a first phase-corrected digital complex signal sample from said first two-dimensional phase locked loop and a second phase-corrected digital complex signal sample from said second two-dimensional phase locked loop, said combining means forming the product of the square root of said first phase-corrected digital complex signal sample and the square root of said second phase-corrected digital complex signal sample.

15. The sampled aperture imaging system as defined in claim 1, wherein each of said phase locked loops comprises a two-dimensional phase locked loop for estimating maximum likelihood of a respective pair of phase aberration angles associated with digital complex signal samples of a respective pair of receive channels.

16. The sampled aperture imaging system as defined in claim 1, wherein each of said phase locked loops comprises a one-dimensional phase locked loop for estimating maximum likelihood of a respective phase aberration angle associated with digital complex signal samples of a respective receive channel.

17. The sampled aperture imaging system as defined in claim 16, wherein each of said one-dimensional phase locked loops comprises first correlation means, respectively, for correlating digital complex signal samples of said respective receive channel with a reference signal, said reference signal being an average of the complex samples of said plurality of receive channels.

18. The sampled aperture imaging system as defined in claim 16, wherein said one-dimensional phase locked loop further comprises first power calculation means for calculating power of the digital complex signal samples of a first one of said receive channels.

19. The sampled aperture imaging system as defined in claim 18, wherein said one-dimensional phase locked loop further comprises second power calculation means for calculating power of said reference signal.

20. The sampled aperture imaging system as defined in claim 16, wherein said one-dimensional phase locked loop further comprises first phase rotating means for correcting phase of the digital complex signal samples of said first receive channel by an amount equal to said first phase aberration angle.

21. The sampled aperture imaging system as defined in claim 20, wherein said one-dimensional phase locked loop further comprises a first whitening filter for filtering digital complex signal samples of said first receive channel, said first whitening filter having an output coupled to an input of said first phase rotating means and having an impulse response selected to perform deconvolution of a first time correlation.

22. A sampled aperture imaging system comprising:

a plurality of transducers;

a plurality of receive channels, each of said receive channels being coupled to a respective one of said transducers for forming complex signal samples in response to detection by said transducers of reflected energy pulses; and a set of phase locked loops for determining the maximum likelihood estimates of phase aberration angles associated with complex signal samples of the receive channels.

23. In a sampled aperture imaging system comprising a plurality of transducers, a plurality of receive channels, each of said receive channels being coupled to a respective one of said transducers for forming complex signal samples in response to detection by said transducers of reflected energy pulses, and a set of phase locked loops for determining the maximum likelihood estimates of phase aberration angles associated with complex signal samples of the receive channels, a method for estimating phase aberrations induced in the sampled aperture imaging system by a phase-aberrating medium, said method comprising:

estimating, in said set of phase locked loops, a phase aberration angle associated with complex signal samples of a respective one of the receive channels in accordance with a two-dimensional, closed loop, maximum likelihood algorithm.

24. In a sampled aperture imaging system comprising a plurality of transducers, a plurality of receive channels, each of said receive channels being coupled to respective one of said transducers for forming complex signal samples in response to detection by said transducers of reflected energy pulses, and a set of phase locked loops for determining the maximum likelihood estimates of phase aberration angles associated with complex signal samples of the receive channels, a method for estimating phase aberrations induced in the sampled aperture imaging system by a phase-aberrating medium, said method comprising:

determining, in said set of phase locked loops, a maximum likelihood estimate $\hat{\theta}_{iML}$ of phase aberration angles in accordance with the equation $$\hat{\theta}_{iML} = \max_{\theta_i}^{-1} \{-\ln[g(\theta_i)]\}$$

where $\theta$ represents phase aberration, $\theta_i$ represents phase aberration in one of the receive channels and i and $g(\theta)$ is given by $$g(\theta_i) = (P_i - Q_i(\theta_i) - Q^*_s(\theta_i) + P_s)$$

where $$P_s = \sum_{k=1}^{K} \sum_{l=1}^{K} \bar{a}_{kl} s(k) s^*(l) q$$

$$P_i = \sum_{k=1}^{K} \sum_{l=1}^{K} \bar{a}_{kl} R_i(k) R_i^*(l)$$

$$Q_i(\theta_i) = e^{-j\theta_i} \sum_{k=1}^{K} \sum_{l=1}^{K} \bar{a}_{kl} R_i(k) s^*(l)$$

where $s(k)$ is the desired signal, $R_i(k)$ represent samples of the complex signals received in channel i, and $\bar{a}_{kl}$ denote the elements of the inverse of a Toeplitz Hermitian-symmetric matrix whose elements $\bar{a}_{kl}$, are given by $$a_{kl} = \frac{1}{2} \bar{R}(k-l)$$

where $k=1, \ldots, K$ and $l=1, \ldots, K$, and $\bar{R}R()$ is the normalized in-channel time autocorrelation function.

25. The method as defined in claim 24, wherein said phase aberration angle is estimated by gradient optimization in accordance with the following equation:

$$\frac{\partial}{\partial \theta_i} \ln[g(\theta_i)] = \frac{-2\Im[Q_i(\theta_i)]}{g(\theta_i)}$$

where $\Im(x)$ represents the imaginary part of x.

26. In a sampled aperture imaging system comprising a plurality of transducers, a plurality of receive channels, each of said receive channels being coupled to a respective one of said transducers for forming complex signal samples in response to detection by said transducers of reflected energy pulses; and a set of phase locked loops for determining the maximum likelihood estimates of phase aberration angles associated with complex signal samples of the receive channels, a method for estimating phase aberrations induced in the sampled aperture imaging system by a phase-aberrating medium, said method comprising:

determining, in said set of phase locked loops, a maximum likelihood estimate $\hat{\theta}_{ML}$ of phase aberration angles in accordance with the equation $$\hat{\theta}_{ML} = \begin{pmatrix} \hat{\theta}_i \\ \hat{\theta}_j \end{pmatrix} = \min_{\theta}^{-1} \ln[g(\theta)]$$

where $\theta$ represents phase aberration, $\theta_i$ and $\theta_j$ represent phase aberration in two of the receive channels i and j, respectively, and $g(\theta)$ is given by $$g(\theta) = (P_i - Q_i(\theta_i) - Q^*_i + P_s)(P_j - Q_j(\theta_j) - Q^*_j(\theta_j) + P_s) - |X_{ij}(\theta_i, \theta_j) - Q^*_j(\theta_j) + P_s|^2$$

where $$P_s = \sum_{k=1}^{K} \sum_{l=1}^{K} \bar{a}_{kl} s(k) s^*(l)$$

$$P_i = \sum_{k=1}^{K} \sum_{l=1}^{K} \bar{a}_{kl} R_i(k) R_i^*(l)$$

$$P_j = \sum_{k=1}^{K} \sum_{l=1}^{K} \bar{a}_{kl} R_j(k) R_j^*(l)$$

$$Q_i(\theta_i) = e^{-j\theta_i} \sum_{k=1}^{K} \sum_{l=1}^{K} \bar{a}_{kl} R_i(k) s^*(l)$$

$$Q_j(\theta_j) = e^{-j\theta_j} \sum_{k=1}^{K} \sum_{l=1}^{K} \bar{a}_{kl} R_j(k) s^*(l)$$

$$X_{ij}(\theta_i, \theta_j) = e^{-j\theta_i} e^{j\theta_j} \sum_{k=1}^{K} \sum_{l=1}^{K} \bar{a}_{kl} R_i(k) R_j^*(l)$$

where $s(k)$ is the desired signal, $R_i(k)$ and $R_j(k)$ represent samples of the complex signals received in said channels i and j, respectively; and $\bar{a}_{kl}$ denotes the elements of the inverse of a Toeplitz Hermitian-symmetric matrix whose elements $a_{kl}$ are given by:

$$a_{kl} = \frac{1}{2} \bar{R}(k-l)$$

where $k=1, \ldots, k$ and $l=1, \ldots, k$, and $\bar{R}()$ is the normalized in-channel time autocorrelation function.

27. The method as defined in claim 26, wherein first and second phase aberration angles associated with complex samples of first and second receive channels respectively are estimated by gradient optimization in accordance with the following equations:

$$\frac{\partial}{\partial \theta_i} \ln[g(\theta)] = \frac{-2\Im[(P_j - Q_j^*(\theta_j))Q_i(\theta_i) + (P_s - Q_j(\theta_j))X_{ij}(\theta_i, \theta_j)]}{g(\theta)}$$

and $$\frac{\partial}{\partial \theta_j} \ln[g(\theta)] = \frac{-2\Im[(P_i - Q_i^*(\theta_i))Q_j(\theta_j) + (P_s - Q_i(\theta_i))X_{ij}^*(\theta_i, \theta_j)]}{g(\theta)}$$

where $\Im[x]$ represents the imaginary part of x.

* * * * *